(12) United States Patent
Willson et al.

(10) Patent No.: US 8,206,089 B2
(45) Date of Patent: Jun. 26, 2012

(54) FLOW CONTROL DEVICE

(75) Inventors: Paul Michael Willson, Manchester (GB); George Andrew Atkinson, Manchester (GB)

(73) Assignee: Parsons Brinckerhoff Limited, Manchester (GB)

(*) Notice: Subject to any disclaimer, the term of this patent is extended or adjusted under 35 U.S.C. 154(b) by 1290 days.

(21) Appl. No.: 11/948,792

(22) Filed: Nov. 30, 2007

(65) Prior Publication Data

US 2009/0067981 A1 Mar. 12, 2009

(30) Foreign Application Priority Data

Dec. 1, 2006 (GB) .................................. 0624046.9

(51) Int. Cl.
*F01D 17/14* (2006.01)

(52) U.S. Cl. ........ 415/151; 415/155; 415/156; 415/159; 415/167

(58) Field of Classification Search .................. 415/150, 415/151, 155, 156, 159, 167
See application file for complete search history.

(56) References Cited

U.S. PATENT DOCUMENTS

| | | | | |
|---|---|---|---|---|
| 761,865 | A * | 6/1904 | Wilkinson | 415/159 |
| 2,838,227 | A * | 6/1958 | Thomas et al. | 415/43 |
| 3,350,061 | A * | 10/1967 | Strass | 415/155 |
| 3,861,823 | A * | 1/1975 | Serovy | 415/151 |
| 4,387,563 | A | 6/1983 | Bell, III | |
| 4,664,594 | A | 5/1987 | Mandet et al. | |
| 5,333,989 | A * | 8/1994 | Missana et al. | 415/150 |
| 5,683,225 | A * | 11/1997 | Orlando et al. | 415/155 |
| 6,162,013 | A * | 12/2000 | Kallberg | 415/150 |
| 6,758,652 | B2 * | 7/2004 | Torre et al. | 415/150 |
| 7,900,431 | B2 | 3/2011 | Willson et al. | |
| 2003/0165382 | A1 * | 9/2003 | Suzuki et al. | 415/151 |
| 2009/0025387 | A1 | 1/2009 | Willson et al. | |

FOREIGN PATENT DOCUMENTS

| | | |
|---|---|---|
| CH | 334772 | 12/1958 |
| EP | 0 191 687 B1 | 8/1986 |
| EP | 0493627 | 7/1992 |
| EP | 1 571 298 | 9/2005 |
| EP | 1 643 133 | 4/2006 |
| GB | 1047530 | 11/1966 |
| GB | 1242534 | 8/1971 |

OTHER PUBLICATIONS

International Preliminary Report on Patentability dated Jun. 11, 2009 for PCT/GB2007/050715.
Search Report under Section 17(5) in Great Britain, Patent Application No. GB0624046.9 dated Mar. 20, 2007.

* cited by examiner

*Primary Examiner* — Christopher Verdier
(74) *Attorney, Agent, or Firm* — Knobbe Martens Olson & Bear, LLP (57) ABSTRACT

A flow control device for controlling fluid flow into a turbine comprising a stator and a rotor located in a fluid flow direction downstream of the stator is provided. The stator has a plurality of vanes extending radially inwards from a casing. Nozzles are defined, with each being defined between each adjacent pair of vanes. A flow controller is arranged to control a nozzle area open for fluid flow from a stator to rotor by altering the radial length of at least one of the nozzles and comprises an actuator and baffle plates connected at first ends thereof to a periphery of the turbine and at second ends thereof to arcuate plates of the actuator. Each baffle plate extends through a corresponding nozzle from an upstream to a downstream side of the stator. The actuator may selectively move the baffle plates to adjust flow through the nozzles.

20 Claims, 6 Drawing Sheets

Fig 1

PRIOR ART

FLOW CONTROL DEVICE

CROSS-REFERENCE TO RELATED APPLICATIONS

This application claims the benefit of UK Patent Application No. 0624046.9, filed on Dec. 1, 2006, the disclosure of which is incorporated by reference.

BACKGROUND OF THE INVENTION

1. Technical Field

The present invention relates to a flow control device and particularly, but not exclusively, to a flow control device for controlling fluid flow into a turbine.

2. Description of the Related Art

Steam turbines include admission control devices to control stream flow and turbine speed. Without the restriction imposed by an admission control device the steam flow into the turbine would be determined by the physical dimensions of the turbine inlet stage (the "swallowing capacity") and by the steam conditions at the inlet.

Generally, the speed and/or power of a steam turbine is controlled by one of two governing modes, determined by the initial design of the turbine.

In a throttle governing mode (generally used for power generating steam turbines and for all large steam turbines), steam is supplied uniformly to the whole portion of the steam turbine. Steam control valves are simultaneously opened and closed at the same rate to control the flow of steam to the turbine. A throttle governing mode is characterised by the use of either a single control valve or multiple valves arranged in parallel and operating in unison.

Throttle governed control restricts the flow to the first stage by a control valve, reducing the pressure at the first stage so that steam flow through the turbine is reduced. The pressure reduction through the partially open control valves increases the entropy of the steam and leads directly to a loss in the work available from the fluid.

The alternative governing mode (nozzle governing mode) is used in industrial and smaller steam turbines, typically rated at less than 100 MW. In this case the first stage nozzles are arranged in separate groups, each independently supplied with steam via a control valve.

Nozzle governed control operates by successively opening the control valve to each nozzle (or nozzle group) such that each nozzle (or group) is individually sequentially opened. As soon as the capacity of a nozzle (group) is reached the next nozzle (group) in order is progressively brought into operation. As a result at any point only one group is throttled while all other groups in operation are functioning at their design point. This mode delivers enhanced part load efficiency compared with throttle governed control.

Figure 1:
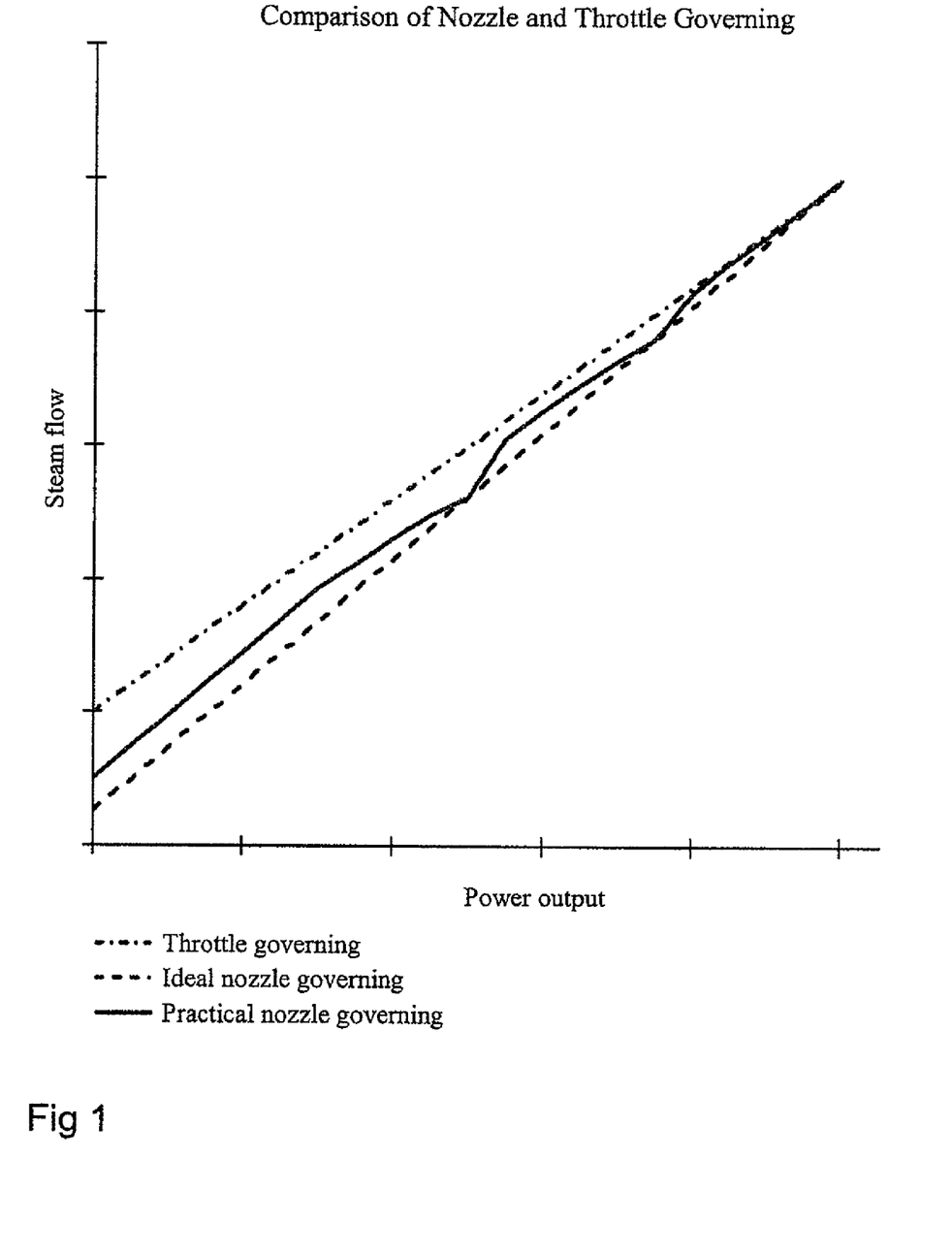
FIG. 1 illustrates a graph with a comparison of operating characteristics of a turbine operating under a throttle governed mode and a turbine operating under a nozzle governed mode (real and ideal)

A comparison of the operating characteristics of turbines operating under the throttle governed mode and nozzle governed mode is shown in FIG. 1 where the upper chain dotted line shows the relationship between power output and steam flow for a turbine operated under a throttle governed mode and the lower dotted line shows the same relationship for an ideal turbine operated under a nozzle governed mode of operation, i.e. with an infinite number of independently controlled nozzles.

The central solid line shows the performance of a real turbine operated under a nozzle governed mode of operation with three independent arcs. This characteristic meets the lower line at each nozzle point, i.e. a point at which the valves are either fully open or fully closed with no valve in a throttling (partially open) condition.

One of the key disadvantages of the nozzle governing mode is that the steam velocity incident on rotating blades of a turbine rotor varies during each turn of the rotor. This cyclic loading subjects the blades to fatigue stresses, necessitating the use of a more robust blade design. Since the design of the rotating blades is affected by the use of the nozzle governing mode, it is generally not feasible to change a steam turbine from a throttle governing mode to a nozzle governing mode without major modifications to the rotor blades.

Larger utility steam turbines use the throttle governing mode as this is the technically feasible and economic design. However, there are a number of circumstances where this design results in throttling losses in normal operation:

(i) where the turbine is dispatched below full output at, for example, 90% output, to provide a margin in case other generating units breakdown, resulting in a shortfall in generation to meet demand. In this case the running turbines are called upon to increase output by opening the throttles; and (ii) where the steam supply system has an output that is limited by temporary or seasonal derating or degradation. Such conditions apply to steam production from gas turbine heat recovery steam generators and from some types of nuclear steam cycle.

In both these cases the reduced output condition becomes a common running condition, with the associated loss of efficiency leading to either increased fuel consumption or reduced output affecting significant numbers of operating hours of the generating unit.

SUMMARY OF THE INVENTION

The present invention seeks to provide for a flow control device having advantages over known such flow control devices.

According to an aspect of the present invention, there is provided a flow control device for controlling fluid flow into a turbine, said turbine comprising: a stator comprising a plurality of vanes extending radially inwards from a casing and arranged to define therebetween a plurality of nozzles extending radially inwards from the casing, each nozzle being defined by adjacent pairs of vanes; a rotor located in a fluid flow direction downstream of said stator and comprising a plurality of blades extending radially from said turbine shaft, wherein said fluid is arranged to be admitted to said turbine upstream of said stator and to flow around said plurality of vanes through said plurality of nozzles for impingement upon said plurality of blades of said rotor; and flow control means arranged to control a nozzle area open for fluid flow by altering the radial length of at least one of said plurality of nozzles, said flow control means comprising: an actuating means comprising a plurality of arcuate plates located within a peripheral cavity in a housing of said turbine such that a longer curved edge of each of said arcuate plates is outermost within said housing of said turbine and a shorter curved edge is innermost; and a baffle arrangement comprising a plurality of baffle plates connected at first ends thereof to a periphery of said turbine and at second ends thereof to said actuating plates, each baffle plate extending through a corresponding nozzle from an upstream side of said stator to a downstream side of said stator, wherein said actuating means is arranged to selectively move said baffle arrangement between a retracted position and an extended position where at least one of said baffle plates extends into a flow channel of a corresponding nozzle, and to maintain said baffle arrangement at either said retracted or extended positions, or at any selected position therebetween, thereby effectively controlling the radial length of at least one of said plurality of nozzles.

The invention is advantageous in achieving control of the steam flow into the steam turbine by control of the area of the nozzle blading open for steam flow. Unlike nozzle control where the area is controlled by selecting the number of sectors open for steam admission, the present invention controls the effective length of the nozzle blades open for steam admission. Reduction in the radial length of the nozzles controls the steam flow without greatly changing steam velocities in the first stage nozzles or varying the steam velocities around the admission arc. Hence the advantages of a nozzle governing mode are obtained without the disadvantage of cyclic variation of steam flow impinging on the rotating blades.

The present invention is advantageous in enabling the most valuable advantages of a nozzle governing mode to be applied in large steam turbines. The invention may be applied to steam turbines without necessitating any changes to rotor blades as large cyclic variations in steam flow are avoided. The invention can be readily applied to newly designed and constructed steam turbines but also can be retrofitted to existing steam turbines by replacement or modification of a small number of removable components. In most such cases such works would not extend the duration of overhauls of the turbine where the rotating parts are removed for inspection or repair.

Preferably the flow control device further comprises an actuating means and a baffle arrangement, both located about a periphery of said turbine adjacent ends of said plurality of vanes of said stator remote from said turbine shaft, wherein said actuating means is arranged to control extension of said baffle arrangement towards said turbine shaft into at least one of said plurality of nozzles at ends remote from said turbine shaft, thereby effectively controlling the radial length of at least one of said plurality of nozzles.

Conveniently, said actuating means is located about said periphery of said turbine between a plane in which a first stage of said stator is located and a plane in which a first stage of said rotor is located.

Further, said baffle arrangement comprises a plurality of baffle plates connected at first ends thereof to a periphery of said turbine on an upstream side of said plurality of nozzles and at second ends thereof to said actuating means on said downstream side of said plurality of nozzles, each baffle plate extending through a corresponding nozzle from said upstream side to said downstream side.

In particular, said actuating means is arranged to move said baffle arrangement between a retracted position and an extended position and to maintain said baffle arrangement at either said retracted or extended positions, or at any selected position therebetween.

Also, said actuating means comprises a plurality of arcuate plates located within a peripheral cavity in a housing of said turbine such that a longer curved edge of each of said arcuate plates is outermost within said housing of said turbine and a shorter curved edge is innermost.

Additionally, said actuating means are arranged to move relative to said housing of said turbine between a first position, corresponding to said retracted position of said baffle arrangement, in which said arcuate plates are located substantially within said peripheral cavity, and a second position, corresponding to said extended position of said baffle arrangement, in which said shorter curved edges of said arcuate plates extend into a flow chamber of said turbine.

Preferably, radial edges of said arcuate plates are located adjacent to corresponding radial edges of adjacent arcuate plates.

Conveniently, said second ends of said baffle plates are connected to said shorter curved edges of said arcuate plates.

Further, an angle of each of said plurality of baffle plates relative to said direction of fluid flow is controllable by movement of said arcuate plates between said first and second positions.

In particular, said actuation means are arranged to move into a flow chamber of said turbine upon introduction of fluid to said cavity via at least one fluid connector.

Also, said baffle plates are biased to move said actuation means from the flow chamber of said turbine upon removal of said fluid from said cavity.

Alternatively, said actuation means are arranged to move into a flow chamber of said turbine upon reception of a control signal.

Further, said baffle plates are biased to move said actuation means from the flow chamber of said turbine when transmission of said control signal to said actuation means ceases.

Advantageously, said baffle plates comprise resilient material.

Preferably, each of said arcuate plates is provided at a first radial edge thereof with a female member and at a second radial edge thereof with a male member, wherein said female member is arranged to receive a corresponding male member of an arcuate plate adjacent said first radial edge and said male member is arranged to cooperate with a corresponding female member of an arcuate plate adjacent said second radial edge.

Conveniently, said peripheral cavity is continuous.

Alternatively, said peripheral cavity is divided into a plurality of non-communicable sections.

The flow device preferably further comprises a plurality of fluid connectors, with each of said plurality of fluid connectors arranged to communicate with a corresponding one of said plurality of non-communicable sections.

The fluid for controlling movement of said actuation means comprises steam, which may derive from any suitable source, such as for example a steam generator, or may be extracted from a convenient location of the turbine itself. Preferably in this case the steam is extracted from an inlet to a first stage of the turbine.

BRIEF DESCRIPTION OF THE DRAWINGS

The present invention is described further hereinafter, by way of example only, with reference to the accompanying drawings in which.

DETAILED DESCRIPTION OF THE PREFERRED EMBODIMENT

Figure 2:
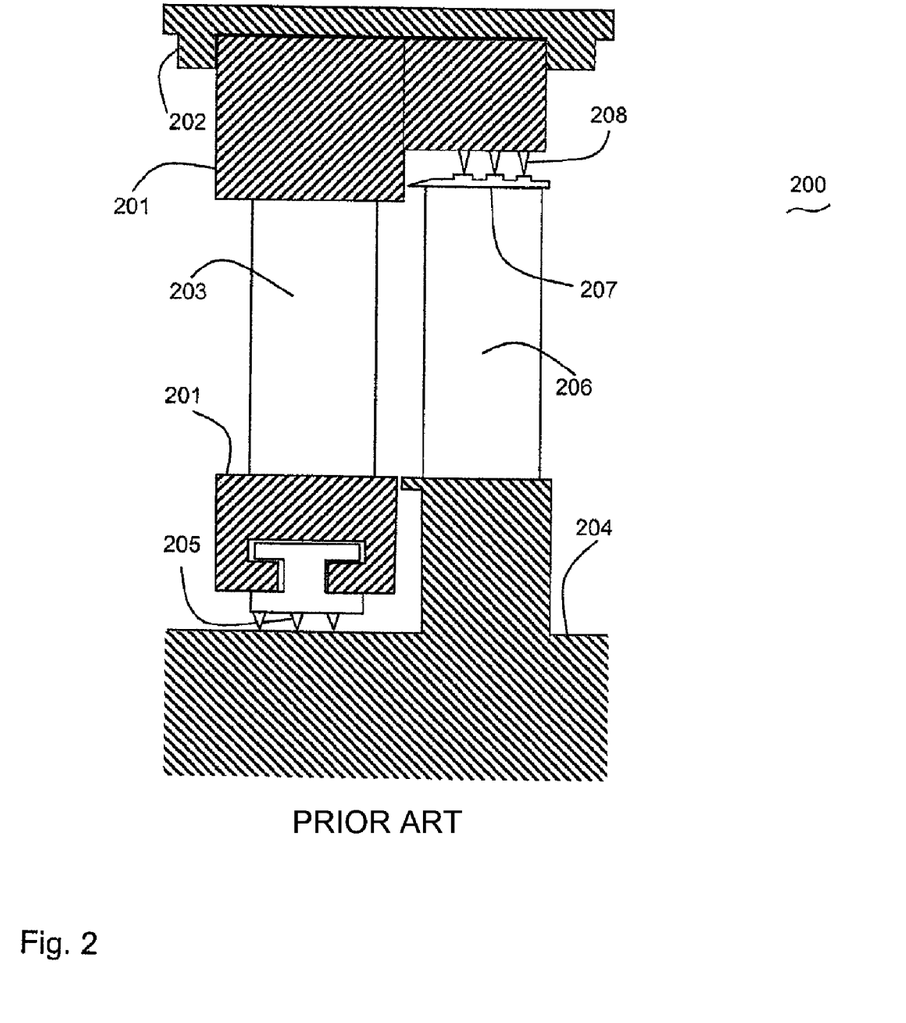
FIG. 2 illustrates schematically a partial section view of a first stage of a conventional steam turbine.

FIG. 2 shows the first stage of a conventional steam turbine 200 in a simplified form. The stage comprises a first stage nozzle diaphragm 201 mounted in steam turbine casing 202. Steam is arranged to flow through the nozzles between vanes 203 in the diaphragm and the diaphragm is sealed onto a turbine shaft 204 by a labyrinth gland seal 205.

Upon admission of steam to the turbine (i.e. steam is admitted to the turbine from the left hand side of the illustrated figure), the steam is accelerated through the nozzles between the vanes 203, impinges on blades 206 which extend radially from said turbine shaft 204 (and which are arranged for rotational movement) and flows onwards into subsequent stages of generally similar construction. The blades 206 are provided at the ends thereof remote from said turbine shaft 204 with a shroud 207 which extends around the periphery of the area swept by the blades 206, and is sealed against leakage by labyrinth tip seal 208.

Figure 3A:
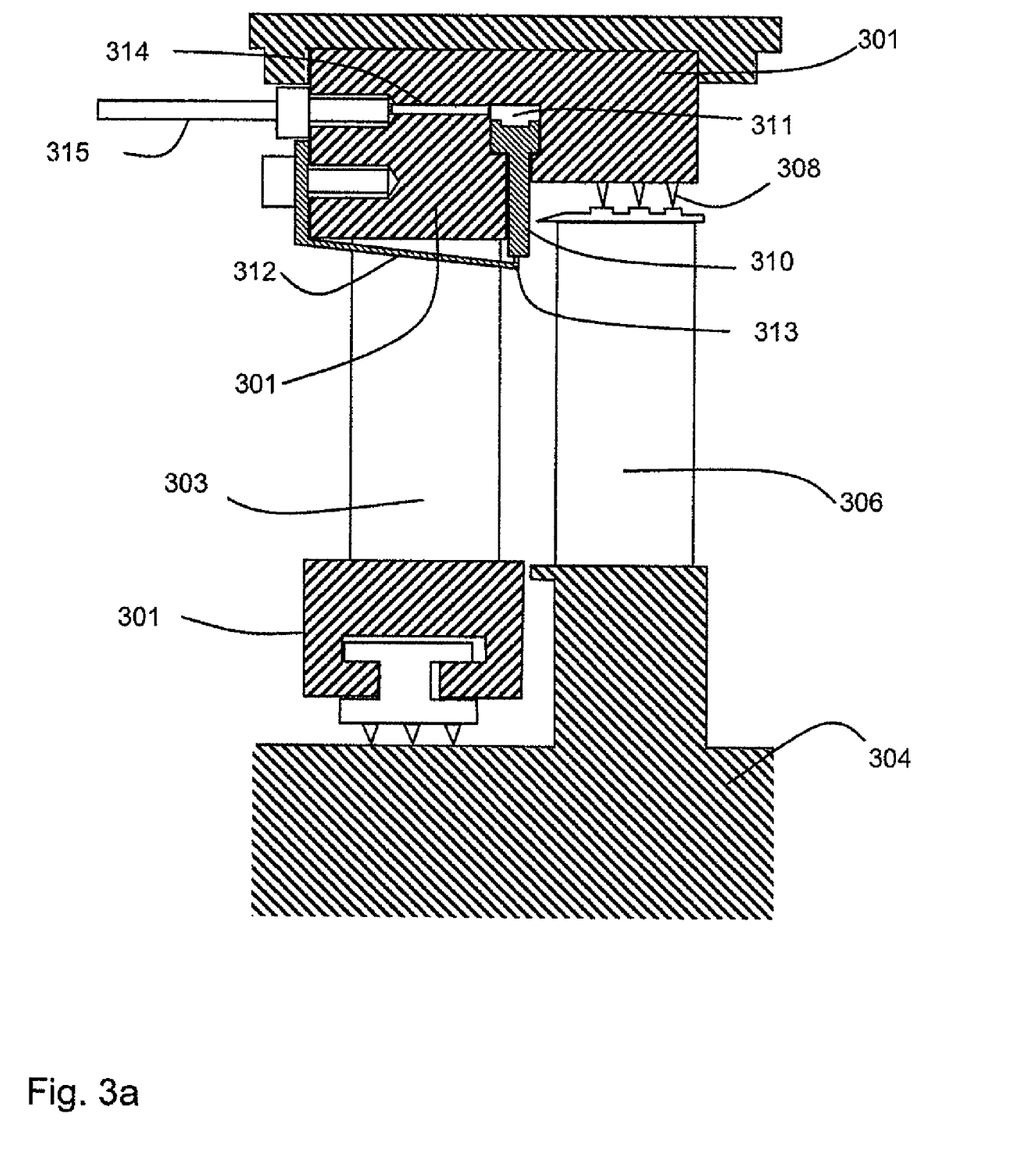
FIG. 3a illustrates schematically a partial section view of a first stage of a steam turbine incorporating the present invention.

The present invention modifies the conventional arrangement of FIG. 2 as shown in FIG. 3a where details are the same as in FIG. 2 except where marked. However, in FIG. 3a, the features common with FIG. 2 are now designated with reference numerals of the type 3XX rather than 2XX. Thus, in FIG. 3a, the diaphragm, for example, has the reference number 301 (rather than 201), and so on.

The present invention provides at least one radial piston 310, located in an enclosed slot 311 between the part of diaphragm 301 supporting vanes 303 and the part supporting tip seal 308. It is preferable that a plurality of radial pistons is provided around the periphery of the turbine.

Radial piston 310 is arranged to move between a retracted position, in which it is located substantially entirely within enclosed slot 311, and an extended position (as illustrated in FIG. 3a) in which it extends radially into a flow chamber of the turbine downstream of a plane in which said vanes 303 are located and upstream of a plane in which blades 306 are located. Additionally, the radial piston is arranged to be maintained at the retracted or extended positions, or at any suitable position therebetween.

A moveable segment 312 comprising a spring strip is provided on an upstream side of said vanes 303 on said diaphragm 301. The moveable segment 312 extends through the nozzle formed between two adjacent vanes 303 and is connected to a tip of said radial piston 310 by means of integral flange 313. It is preferable that the number of moveable segments 312 corresponds to the number of nozzles and that each moveable segment extends through a corresponding nozzle.

The radial piston 310 is arranged to lift moveable segment 312 by moving to its extended position. Movement of the radial piston is controlled by means of actuating steam which is admitted to the enclosed slot 311 via a connection 314 from a control valve via tube 315. As stated above, FIG. 3a shows the mechanism in the extended position when actuating steam is applied.

The actuating steam may derive from any suitable source, such as for example a steam generator, or may be extracted from a convenient location of the turbine itself, preferably an inlet to a first stage of the turbine.

Closure of the control valve enables the piston 310 to return to its retracted position due to the resilient nature of the spring strip forming said moveable segment 312 and the steam pressure forces acting on segment 312. Steam remaining behind the piston then simply leaks away.

Figure 3B:
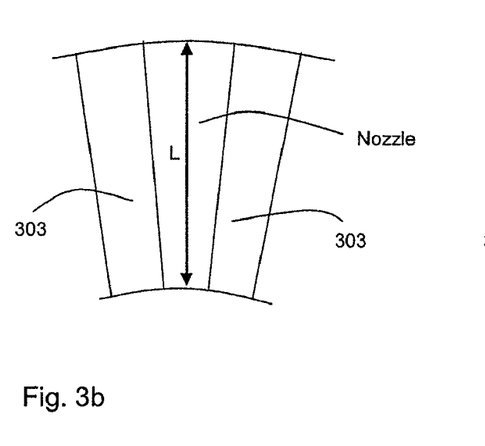
FIG. 3b illustrates schematically a cross-sectional view of a nozzle formed between two adjacent vanes in a first configuration.

FIG. 3b illustrates a single nozzle formed between two adjacent vanes 303 when the radial piston 310 is in its retracted position. As can be seen from the figure, the length "L" of the nozzle is the same as the length of the vanes 303 from root to tip. In this state, the nozzle is in a "fully open" condition.

Figure 3C:
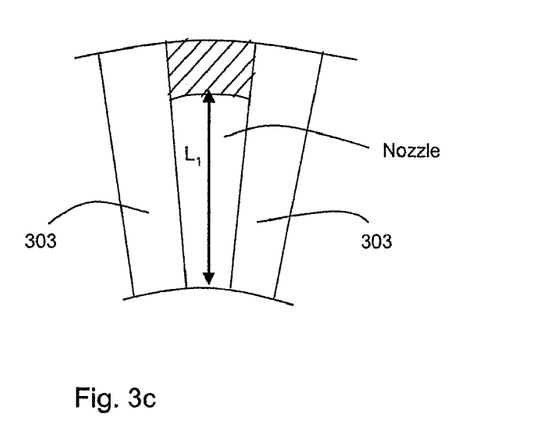
FIG. 3c illustrates schematically a cross-sectional view of a nozzle formed between two adjacent vanes in a second configuration.

FIG. 3c illustrates the same single nozzle between two adjacent vanes 303 as FIG. 3b except that the radial piston 310 is now in its fully extended position. As can be seen from FIG. 3c, this has had the effect of "pushing" the moveable segment 312 into the nozzle, thereby effectively reducing the overall length of the nozzle to "$L_1$" (where $L_1 < L$). Therefore, the overall nozzle area is reduced which results in a reduced flow of steam through the nozzle.

The nozzle area can be controlled by altering the extent to which the radial piston 310 extends into the flow chamber of the turbine.

Figure 3D:
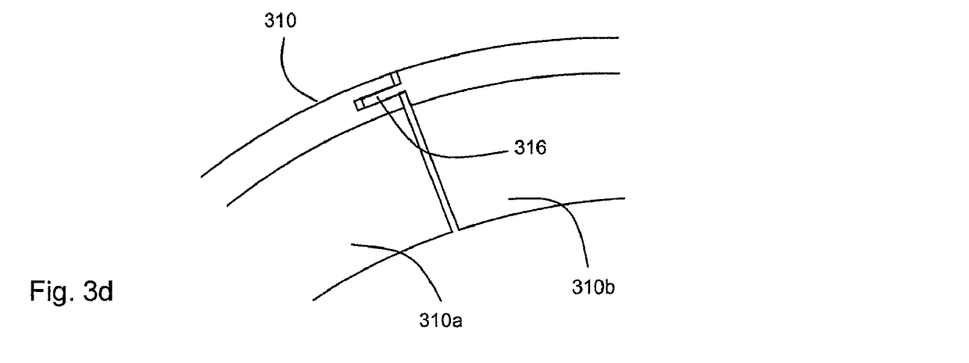
FIG. 3d illustrates schematically a partial view of a radial piston forming part of the present invention.

FIG. 3d illustrates the construction of the radial piston 310. The figure illustrates two adjacent radial pistons 310a, 310b which are formed from arcuate segments in which a longer curved side (i.e. the root) lies outermost when in position in said turbine, i.e. the root is located within enclosed slot (not shown). The shorter curved side (i.e. the tip) is the part of the piston to which the spring strip (not shown) is attached, and it is the tip which can extend into the flow chamber of the turbine.

The straight (i.e. radial) edges of the arcuate segments forming the radial pistons 310a, 310b lie adjacent to corresponding straight edges of adjacent arcuate segments when in situ. Thus, as shown in FIG. 3d, a "right-hand" edge of radial piston 310a is located adjacent a "left-hand" edge of adjacent radial piston 310b.

The construction of the radial piston in segments permits radial movement of the radial pistons relative to the axis of rotation of the turbine.

In the arrangement shown in FIG. 3d, the "right-hand" edge of radial piston 310a is provided with a female member arranged to cooperate with a corresponding male member 316 provided on a "left hand" edge of radial piston 310b. This arrangement of interlocking male/female members acts to reduce steam leakage between the radial edges of adjacent segments.

In an alternative arrangement, the radial edges of the segments forming the radial pistons are plain and do not have such cooperating members.

Figure 4:
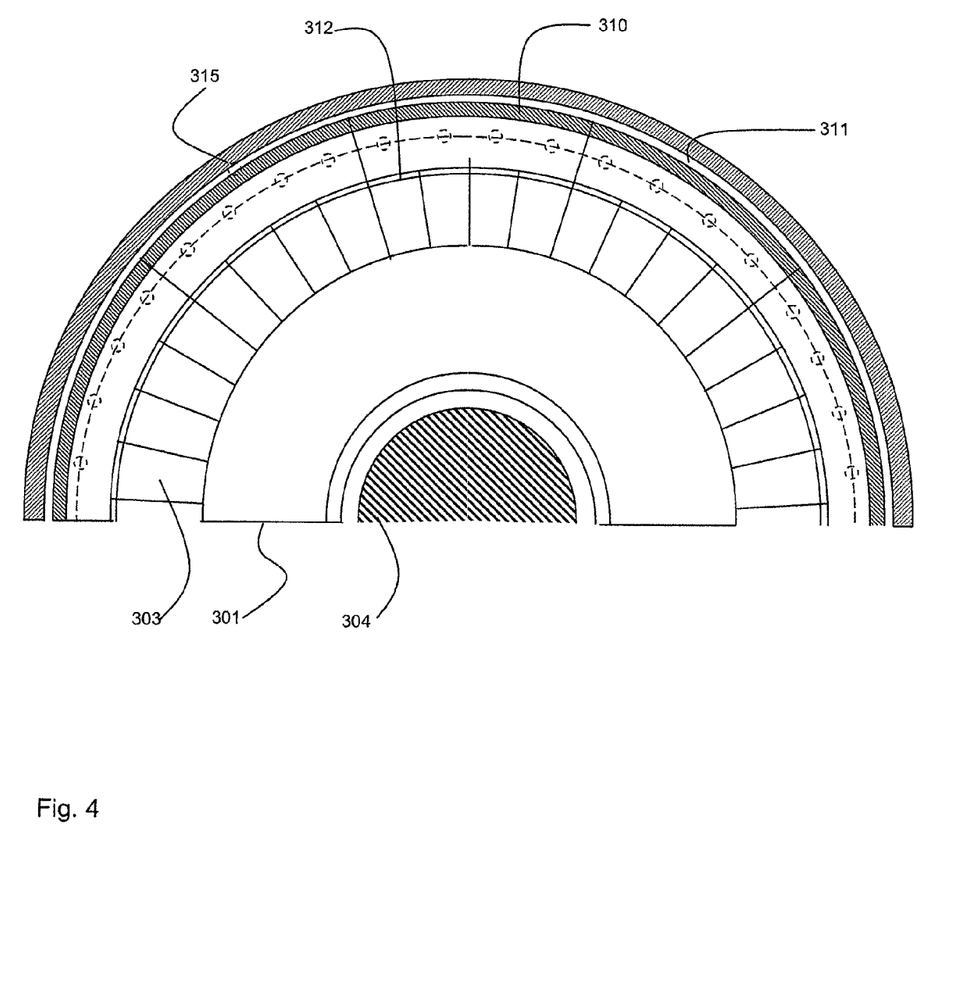
FIG. 4 illustrates schematically a partial cross-sectional view of a steam turbine incorporating the present invention in a first embodiment.

FIG. 4 illustrates a partial cross-sectional view of a turbine incorporating the present invention as viewed along an axis of rotation of the turbine.

Diaphragm 301 carries vanes 303 and moveable segments 312 are located between the vanes and are arranged for movement by movement of the radial pistons 310 which are located continuously around the periphery of the turbine in slot 311. The admission of steam to the slot 311 from tube 315 applies pressure on the outside edge of the radial pistons 310 (i.e. the longer curved edge of the arcuate segments) and moves all radial pistons 310 into the extended (i.e. raised) position together.

Figure 5:
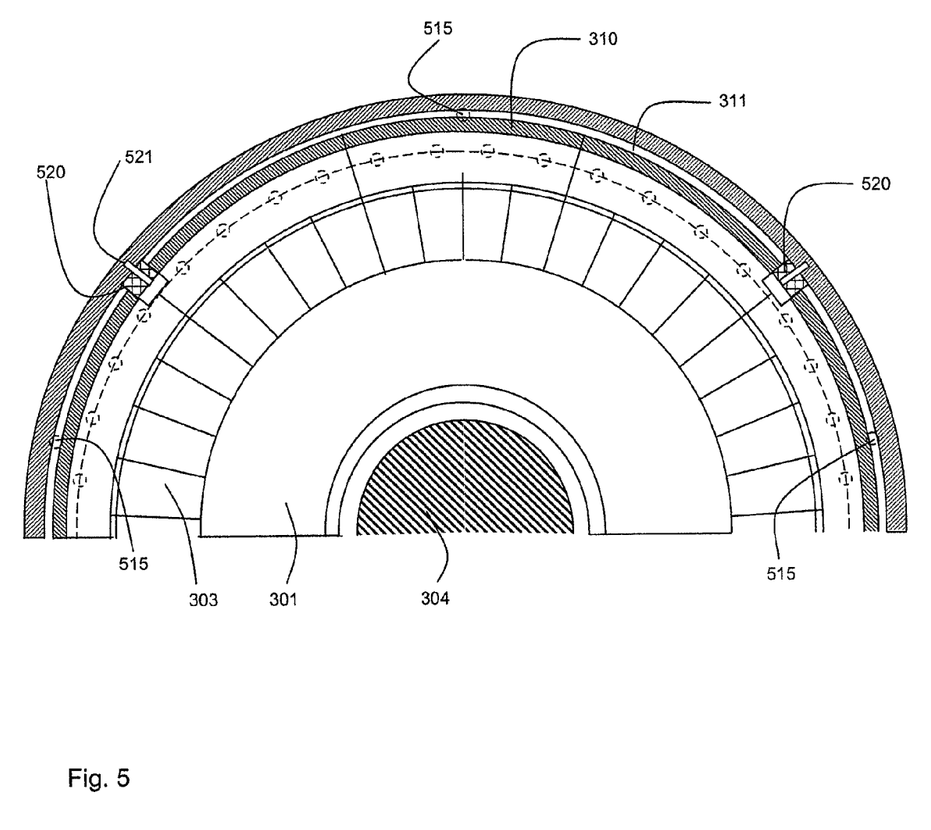
FIG. 5 illustrates schematically a partial cross-sectional view of a steam turbine incorporating the present invention in a second embodiment.

FIG. 5 illustrates a second embodiment of the present invention which is similar to the first embodiment as illustrated in FIG. 4 except as shown. FIG. 5, as per FIG. 4, illustrates a partial cross-sectional view of a turbine incorporating the present invention as viewed along an axis of rotation of the turbine.

This embodiment provides for control of sectors of radial pistons either individually, or as groups independently of each other.

This embodiment differs from the first embodiment in that the slot 311 in which the radial pistons 310 move is divided into isolated sectors using close fitting sealing blocks 520 fixed into place using locking devices 521. Each sector of the slot is then supplied with actuating steam from a dedicated valve using tubes 515.

FIG. 5 illustrates an arrangement in which each sector contains groups of three radial pistons, and where each sector is controlled independently. Such an arrangement permits three steps of turbine capacity below the maximum level at typically 76%, 84% and 92%.

It should be noted that the present invention is not intended to replace a throttle valve of a turbine entirely as the reduction of the nozzle blade length is limited so that control by device of the present invention is restricted to the higher part of the flow range, typically above 75%. Further, the present invention reduces the working length of the nozzle by a preset amount, fixed at the design stage.

The simpler version of the flow control device of the invention as described in the first embodiment reduces the nozzle working length on the whole first stage nozzle together, ensuring that steam flows and velocities are uniform for the 360° admission arc to the rotating blading of the turbine.

In the alternative implementation of the invention as described in the second embodiment, the flow control device reduces the nozzle working length on separate groups of nozzles. The nozzle working lengths on each group can then be selected to be reduced or not. Appropriate selection of the groups to each position then allows a stepwise control of turbine output over a range from, for example, 80% to 100% output, with the throttle valve giving fine flow control, resulting in very high levels of efficiency across the range. This implementation of the invention maintains uniformity of steam velocities but results in variation of e.g. 20% peak-peak, in the steam flow around the 360° admission arc to the rotating blading. The resulting cyclic stress loading on the rotating blades would be lower than that induced by an equivalent conventional nozzle governed machine.

The incorporation of the present invention into a steam turbine provides the following advantages:

1. Efficiency at reduced load increased by ~1-2%;
2. Enables Steam Turbine capacity to be matched to the current capability of the steam supply system to maximise power output from available steam.
3. The simple version of implementation (as described in the first embodiment) introduces no variation in steam flow around the admission arc, avoiding the need for any modification to rotating components of existing designs and machines.
4. The more elaborate implementation (as described in the second embodiment) enables a stepwise progressive adjustment of capacity over the higher load range giving high efficiencies over the whole range with limited cyclic loading on the rotor blades, normally within the design margins of the conventional blading designed for throttle governing.
5. Allows the nominal capacity of the steam turbine to be switched very quickly between two or more levels.
6. Modification can be applied to existing designs and existing units at low cost and the revised parts can generally be installed without extension of any maintenance outage during which the steam turbine casing is opened.
7. The invention is most readily applied to steam turbines with lower temperature steam admission, although appropriate selection of materials would permit its use on high temperature steam turbines.

It should be understood that the flow control device described above and as illustrated in the figures is merely exemplary in nature, and other types or configurations of flow control device can be used as well.

What is claimed is:

1. A flow control device for controlling fluid flow into a turbine, said turbine comprising:
    a stator comprising a plurality of vanes extending radially inwards from a casing and arranged to define a plurality of nozzles extending radially inwards from said casing, each nozzle being defined by adjacent pairs of vanes;
    a rotor located in a fluid flow direction downstream of said stator and comprising a plurality of blades extending radially from a turbine shaft, wherein a fluid is arranged to be admitted to said turbine upstream of said stator and to flow around said plurality of vanes through said plurality of nozzles for impingement upon said plurality of blades of said rotor; and
    flow control means arranged to control a nozzle area open for fluid flow by altering a radial length of at least one of said plurality of nozzles, said flow control means comprising:
        an actuating means comprising a plurality of arcuate plates located within a peripheral cavity in a housing of said turbine such that a longer curved edge of each of said arcuate plates is outermost within said housing of said turbine and a shorter curved edge is innermost; and
        a baffle arrangement comprising a plurality of baffle plates connected at first ends thereof to a periphery of said turbine and at second ends thereof to said arcuate plates, each baffle plate extending through a corresponding nozzle from an upstream side of said stator to a downstream side of said stator,
        wherein said actuating means is arranged to selectively move said baffle arrangement between a retracted position and an extended position where at least one of said baffle plates extends into a flow channel of a corresponding nozzle, and to maintain said baffle arrangement at either said retracted or extended positions, or at any selected position therebetween, thereby effectively controlling the radial length of at least one of said plurality of nozzles.

2. A device according to claim 1, wherein said actuating means is located between a plane in which said stator is located and a plane in which said rotor is located.

3. A device according to claim 1, wherein said first ends of said baffle plates are located on said upstream side of said plurality of nozzles and said second ends of said baffle plates are located on said downstream side of said plurality of nozzles.

4. A device according to claim 1, wherein said actuating means are arranged to move relative to said housing of said turbine between a first position, corresponding to said retracted position of said baffle arrangement, in which said arcuate plates are located substantially within said peripheral cavity, and a second position, corresponding to said extended position of said baffle arrangement, in which said shorter curved edges of said arcuate plates extend into a flow chamber of said turbine.

5. A device according to claim 4, wherein an angle of each of said plurality of baffle plates relative to said direction of fluid flow is controllable by movement of said arcuate plates between said first and second positions.

6. A device according to claim 1, wherein radial edges of said arcuate plates are located adjacent to corresponding radial edges of adjacent arcuate plates.

7. A device according to claim 3, wherein said second ends of said baffle plates are connected to said shorter curved edges of said arcuate plates.

8. A device according to claim 1, wherein said actuating means are arranged to move into a flow chamber of said turbine upon introduction of fluid to said cavity via at least one fluid connector.

9. A device according to claim 8, wherein said baffle plates are biased to move said actuating means from the flow chamber of said turbine upon removal of said fluid from said cavity.

10. A device according to claim 1, wherein said actuating means are arranged to move into a flow chamber of said turbine upon reception of a control signal.

11. A device according to claim 10, wherein said baffle plates are biased to move said actuating means from the flow chamber of said turbine when transmission of said control signal to said actuating means ceases.

12. A device according to claim 1, wherein said baffle plates comprise resilient material.

13. A device according to claim 1, wherein each of said arcuate plates is provided at a first radial edge thereof with a female member and at a second radial edge thereof with a male member, wherein said female member is arranged to receive a corresponding male member of an arcuate plate adjacent said first radial edge and said male member is arranged to cooperate with a corresponding female member of an arcuate plate adjacent said second radial edge.

14. A device according to claim 1, wherein said peripheral cavity is continuous.

15. A device according to claim 1, wherein said peripheral cavity is divided into a plurality of non-communicable sections.

16. A device according to claim 15, comprising a plurality of fluid connectors, with each of said plurality of fluid connectors arranged to communicate with a corresponding one of said plurality of non-communicable sections.

17. A device according to claim 8, wherein said fluid comprises steam.

18. A device according to claim 17, wherein said steam derives from a steam generator.

19. A device according to claim 17, wherein said steam derives from a location of the turbine itself.

20. A device according to claim 19, wherein said steam is extracted from an inlet to a first stage of the turbine.

* * * * *